Sheet 1. 2 Sheets.

J. Pickles.
App's for Manufacture of Extract of Bark.
Nº 88,807. Patented Apr. 13, 1869.

Witnesses,
Henry C. Houston.
Wm Franklin Seavey

Inventor,
John Pickles
Per Wm H. Clifford atty

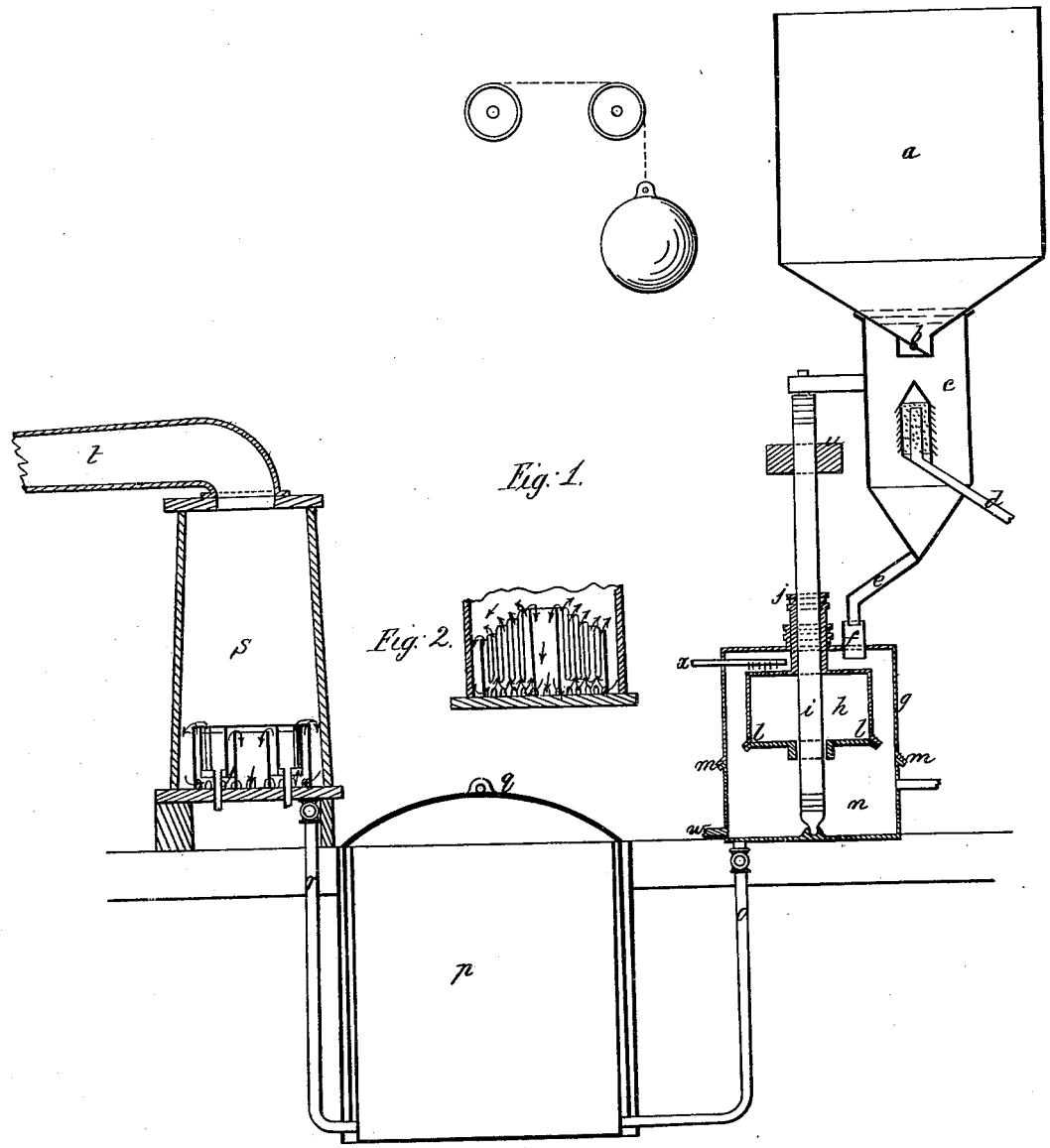

JOHN PICKLES, OF WIGAN, ENGLAND.

Letters Patent No. 88,807, dated April 13, 1869.

IMPROVED PROCESS AND APPARATUS FOR THE MANUFACTURE OF EXTRACT OF BARK, &c.

The Schedule referred to in these Letters Patent and making part of the same.

*To all whom it may concern:*

Be it known that I, JOHN PICKLES, of Wigan, in the county of Lancaster, England, have invented a new and useful Process and Apparatus for Manufacturing the Extract from the Bark, Wood, and Leaves of Trees Containing Tannin and other products, as hemlock, oak, &c., and reducing the same to a solid or powdered substance; and I hereby declare the following to be a full, clear, and exact description thereof, which will enable others to make and use my invention, reference being had to the accompanying drawings, forming part of this specification, in which—

Figure 1:
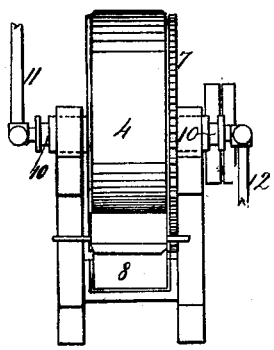
Figure 2:
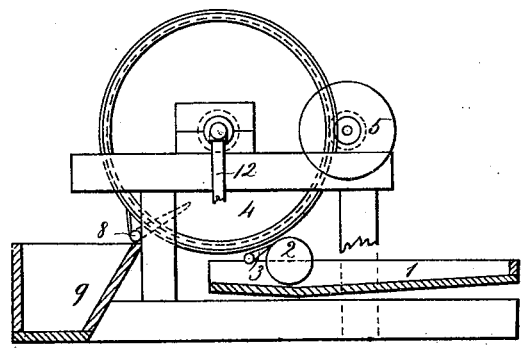
Figure 3:
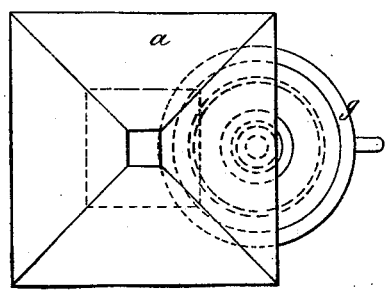
Figure 3:
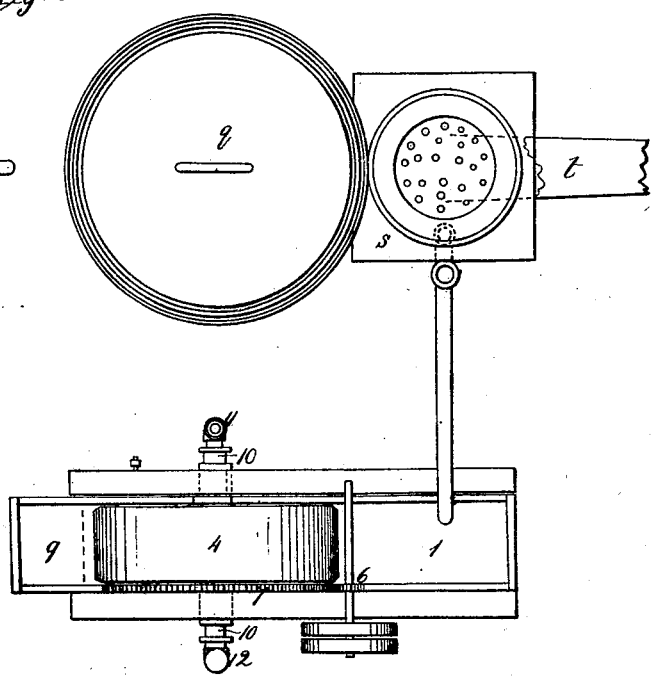

Plate 1:
Figure 1 is a sectional elevation.
Figure 2 is a section of the ring drum heater.
Plate 2:
Figure 1 is an end view of the solidifier.
Figure 2 is a side view of same.
Figure 3 is a top plan of the machine.
Same letters show like parts.

My invention consists in the process of making extracts of various kinds, but more particularly those obtained from hemlock, oak, &c., containing tanning-matter.

It consists, first, in the process of obtaining the said extracts in a liquid or semi-liquid form.

It further consists in reducing the said liquid or semi-liquid extract into a solid or powdered condition.

It further consists in preserving the said liquid or semi-liquid extract from exposure to the atmosphere.

My invention further consists in a device, hereinafter to be described, for leaching the bark or other substance.

My invention also consists in the device, hereinafter to be described, for converting the said liquid or semi-liquid extract into a solid or powdered form.

The difficulty of dealing with hemlock-extract, now an article of extensive commerce, is becoming greater every day, many shippers refusing it transport, for the reason that, even when in the best description of barrels, the damage caused by leaking is often more than the profits derived from the carriage.

By reducing the liquid extract to a solid or powdered state, these difficulties of transportation cease. No fermentation, during either transport or storage, can take place. There is no loss by leakage, and it can be transported as readily as flour or cereals, put up in bags, boxes, &c., instead of barrels. Moreover, the expense is lessened in proportion to the diminished bulk and weight.

In the treatment of hemlock or other barks, I first reduce the bark to a finely-powdered state, by grinding or bruising it, by any of the known methods now in use; and, when so prepared, I place the same in the vat or receiver $a$, of any suitable size, provided with a conical bottom, and an outlet-valve or slide, at $b$, to cut off the connection, when the required quantity has passed into the softening or steaming-chamber $c$, provided with a steam-pipe, $d$, having a perforated conical hood.

This steam-pipe is placed in a central position in the chamber $c$, and supplied from any ordinary steam-boiler, or any other source.

The chamber $c$ has also a conical bottom, and, leading from it, a pipe or conveyer, $e$, to the socket $f$, at the top of the casing $g$, covering a revolving leach, $h$; and said pipe is to be provided with a slide or valve, in any suitable position.

The revolving leach, into which the powdered material is conducted, is constructed as follows:

The central spindle or shaft $i$ carries the leach $h$, properly so called, and which is in two parts, the table or circular flat part being fast on the shaft, and working or revolving with it constantly, while the top part or screen is attached to the sleeve $j$, which is free on the central spindle $i$, and resting on the slanting edges of the table, at $l\ l$, when not elevated, for the purpose of discharging its contents.

The casing $g$ slides, in a similar manner, over the sleeve of the screen, and has bevel-edges, at $m\ m$; and it is evident that, when any substance, as bark, is placed in the leach, and washed out, if the casing $g$ and screen are elevated, by the collars provided for that purpose, by such elevation, an opening will be made, and, the screen ceasing revolution, the contents will fall on the table, still revolving, by means of the pulley or gear $u$, and be thrown outside of the tank $n$, thus making the leach self-discharging.

As shown, when the bark is placed in this revolving leach or centrifugal, and the same put in motion, water is to be admitted to the tank $n$, by the supply-pipe, and is allowed to pass out, by the pipe $w$, to a pump, or any other machine for forcing the same through the perforated pipe $x$, so fixed as to distribute the same over the contents of the leach, and kept in circulation until sufficiently charged with the extract, when it is run off, by the pipe $o$, to the liquor-receiver $p$, and a fresh supply of water admitted, and so continued until the whole of the extract or tanning-matter is washed from the contents of the leach, which is then to be emptied, by lifting the casing $g$ and screen, to be filled again from the softening-chamber $c$, and the operation of washing out the soluble extract continued.

The liquor or extract-tank $p$ is similar in arrangement and construction to an ordinary gasometer and cover, $q$, with this exception, that the sides are double, the space between them being filled with water, and the inside space containing the liquid extract.

If this arrangement is applied in sugar-manufacture, as it may be, the cane-juice will be protected from the action of the atmosphere, the effect of which is a phenomenon well known to manufacturers of the article.

From the liquor or extract-tank, the pipe $r$ conveys the liquid to the evaporator $s$, which is composed of a casing, of any suitable material, held between the top and bottom.

Attached to and resting on feet on the bottom is a steam-heated ring drum heater, for producing evaporation, formed by having top and bottom head-sheets perforated, for tubes, and an inner and outer shell. It may be constructed of any suitable size or material, with any number of tubes passing between the head-sheets, and attached thereto, or may consist of a series of any number of hollow rings, whole or in segments, with annular spaces between them, as in the drawings, each having a separate steam-supply pipe and discharge-pipe, for the products of condensation, and so arranged that the smaller one in diameter will have a proportionate space in the centre, for the purpose of allowing the free passage of the descending current of the contents when under treatment.

To further increase the rapidity and certainty of this circulation, the inner space may be provided with a loose casing, of the depth of the ring drums, and having any number of openings where it rests on the bottom of the evaporator, its outward diameter to be such as to leave a sufficient space between it and the inner heated surface of the drum, so that this inner heated surface will give a circulation of the liquids ascending, and the interior area of the casing a free current descending, the liquid product passing through the openings before mentioned, and ascending through this annular space, or the tubes.

A similar casing can be provided for the outside of the drum, with equally good results in facilitating evaporation.

Another form of evaporator may have alternate heated rings and annular casings, giving quicker ascending and descending currents.

Other and various forms and combinations, as square or separate flat pieces, of plate form, with separating-plates, may be used, and are all effective in creating circulation, and thus increasing evaporation.

Whether these forms of evaporators are employed for concentrating tanning-extracts, or in the manufacture of sugar, or concentration of other products, and in all the various forms, there is this decided advantage over the worm in any shape, that all the parts are accessible, for the purpose of cleaning and thorough examination, and, in the form of hollow rings, whole or in segments, any one ring or section can be detached from its steam and other connections, and removed, for repairs, without impairing the efficiency of the rest.

At the top of the evaporator $s$, the products of evaporation are conveyed, by the pipe $t$, to any ordinary condenser; and on the casing are attached the ordinary sight-glasses, gauge-glass, &c.

I do not claim the evaporator in itself, considered as a vacuum-evaporator, as they are in common use; but, by my drawings and description, I show a material alteration in the interior or heat-giving arrangements, for producing circulation of the liquid contents, and rapid evaporation.

The bottom of the evaporator $s$ is also provided with an outlet-pipe and stop-valve or cock, by which the extract, when sufficiently condensed, can be conveyed to the tank 1, for supplying the drum or heated revolving surface, for the purpose of converting the liquid or semi-liquid extract thus obtained into a solid or powdered substance.

Some degree of difficulty attaches itself to converting the tanning-products into solids, except in thin layers, on heated metal surfaces. The form shown is one of the many forms in which heated surfaces can be applied for this purpose, when in motion.

I am aware that heated metallic surfaces have been used before, but in all cases have been fixtures; and I am not aware that a moving heated surface, supplied with a thin stratum of extract, has ever been employed, or that it has been before discovered that a moving surface of this nature was more advantageous in the production of the desired condensation than any of those above referred to.

As before shown, the condensed extract, or other product, passing from the evaporator by the outlet-pipe, is conveyed to the tank 1, and is lifted up, by the feed-roll 2, in such quantities as the scraper 3 will allow to pass, and delivered on the surface of the heated cylinder 4, kept in revolution by means of the pulley 5 and pinion 6, working in a gear-wheel, 7, attached to the side of the cylinder 4, or by any other suitable arrangement; and, when the revolution of the heated cylinder has effected the hardening or solidifying, the product comes into contact with the scraper 8, made in one or more parts, and fixed at any angle, causing the hardened products to fall into the box 9, from whence it is conveyed wherever required for further operations.

The cylinder 4 is made to revolve on trunnions 10, 10, hollow, and provided with stuffing-boxes, admitting the passage of the inlet-pipe 11, for the steam, hot water, or hot air, used for heating the same, and, on the opposite side, the outlet-pipe 12, for conveying off waste-water, and keeping up circulation, to supply the heat lost during the operation.

I do not claim softening the bark preparatory to leaching, for this is not new. Neither do I claim separating or opening the particles of the ground material, by the application of steam or water, as a part of the operation of leaching.

I do not claim a self-discharging centrifugal or leach, of any form, or however operated.

I desire to specify that the moving heated surfaces before described can be successfully employed for the conversion of concentrated cane or saccharine juices into a solidified or condensed form, for shipment, for refiners' use.

What I claim as my invention, and desire to secure by Letters Patent, is—

1. The rotary and self-discharging leach, constructed and operating substantially as described.

2. The vat or receptacle $p$, made and employed substantially as described, in connection with the rotary self-discharging leach, as set forth.

3. The roller 2 and scraper 3, in the tank 1, substantially as described.

4. The rotary heated cylinder 4, in conjunction with roller 2, scraper 3, scraper 8, and the two tanks or receptacles 1 and 9, substantially as described.

5. The process of washing or leaching the bark, prepared as herein described, and taking from it the liquid extract, and then converting the liquid or semi-liquid into a solid or powdered form, or dry state, substantially as herein described.

6. The preparation of the extract of bark, &c., for the purposes of transportation, substantially as described.

7. Protecting the liquid or semi-liquid extract from the effect of exposure to the atmosphere, substantially as described.

8. The ring heated drum, with its tubes, and inner and outer circulating-casings, or without one or both of them, or the various forms of annular heaters, whole or in segments, with or without circulating-casings, or their substitutes of flat heaters and plates, for the purposes of evaporation or concentration of liquid tannin-extracts, cane or saccharine juices, or other products, as herein described.

JOHN PICKLES.

Witnesses:
JNO. NICHOLLS,
WM. F. LIGHTHALL.